(12) United States Patent
Jaroliya et al.

(10) Patent No.: US 12,373,777 B1
(45) Date of Patent: Jul. 29, 2025

(54) MACHINE LEARNING TECHNIQUES FOR DIRECTED STORAGE GUIDANCE IN INVENTORY BINS OF MOVEABLE INVENTORY HOLDERS

(71) Applicant: Amazon Technologies, Inc., Seattle, WA (US)

(72) Inventors: Neeru Jaroliya, Bhiwani (IN); Abhisek Mukhopadhyay, Shyamnagar (IN); Prakher Tayal, Bangalore (IN); Srikanth Krishna, Bangalore (IN); Andrew Johnson, Bellevue, WA (US); Vighnesh Mahale, Hubballi (IN); Shashank Kumar Singh, Benares (IN); Rajeev Ramanath, Bangalore (IN); Neeraj Jain, Jaipur (IN)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 18/080,230

(22) Filed: Dec. 13, 2022

(51) Int. Cl.
G06Q 10/087 (2023.01)
B65G 1/04 (2006.01)
B65G 1/137 (2006.01)

(52) U.S. Cl.
CPC ......... *G06Q 10/087* (2013.01); *B65G 1/0485* (2013.01); *B65G 1/1371* (2013.01); *B65G 1/1373* (2013.01)

(58) Field of Classification Search
CPC .. G06Q 10/087; B65G 1/0485; B65G 1/1371; B65G 1/1373
See application file for complete search history.

(56) References Cited

U.S. PATENT DOCUMENTS 7,221,276 B2 * 5/2007 Olsen, III ............... B07C 7/005
700/226
8,423,431 B1 * 4/2013 Rouaix ............... G06Q 10/087
705/28

(Continued)

FOREIGN PATENT DOCUMENTS

JP  2013086939 A  *  5/2013
JP  2014230219 A  * 12/2014

(Continued)

OTHER PUBLICATIONS

Z.-H. Chong et al., "An Innovative Robotics Stowing Strategy For Inventory Replenishment In Automated Storage And Retrieval System," 2018 15th International Conference on Control, Automation, Robotics and Vision (ICARCV), Singapore, 2018, pp. 305-310 (Year: 2018).*

*Primary Examiner* — Ashford S Hayles
(74) *Attorney, Agent, or Firm* — Kilpatrick Townsend & Stockton LLP (57) ABSTRACT

A method may include determining inventory item information associated with an inventory item to be stowed in an inventory system that comprises a plurality of moveable inventory holders. The method may also include determining inventory holder information that characterizes one or more properties of a moveable inventory holder of the plurality of moveable inventory holders. The moveable inventory holder may include a plurality of inventory bins. The method may also include determining, using a machine learning model, a set of candidate inventory bins of the plurality of inventory bins based on the inventory item information and the inventory holder information. The method may also include providing for presentation a set of cues corresponding to the set of candidate inventory bins.

18 Claims, 7 Drawing Sheets

(56) References Cited

U.S. PATENT DOCUMENTS

| | | | |
|---|---|---|---|
| 8,560,461 B1* | 10/2013 | Tian | G06Q 10/087 705/332 |
| 10,035,616 B1* | 7/2018 | Hood | B65B 67/08 |
| 10,127,514 B2* | 11/2018 | Napoli | G06Q 10/083 |
| 10,192,195 B1* | 1/2019 | Brazeau | B25J 9/1661 |
| 10,592,854 B2* | 3/2020 | Schwartz | G06Q 10/087 |
| 10,792,810 B1* | 10/2020 | Beckman | B25J 9/163 |
| 10,807,808 B1* | 10/2020 | Rodgers | B25J 9/0093 |
| 11,010,903 B1* | 5/2021 | Gallaudet | G06V 20/46 |
| 11,176,628 B1* | 11/2021 | Raghavan | G06Q 10/083 |
| 11,216,774 B2* | 1/2022 | Powers | G06Q 10/08345 |
| 11,318,499 B2* | 5/2022 | Kalouche | B65G 1/1376 |
| 11,514,386 B1* | 11/2022 | Soles | G06Q 10/083 |
| 11,568,356 B1* | 1/2023 | Rochon | G06T 11/00 |
| 2002/0010519 A1* | 1/2002 | Watanabe | G05B 15/02 705/28 |
| 2003/0036985 A1* | 2/2003 | Soderholm | G06K 17/0022 705/28 |
| 2008/0183328 A1* | 7/2008 | Danelski | G06Q 50/40 705/28 |
| 2013/0119138 A1* | 5/2013 | Winkel | G06Q 10/087 235/462.1 |
| 2014/0324642 A1* | 10/2014 | Winkel | G06Q 10/087 705/28 |
| 2014/0364995 A1* | 12/2014 | Guan | B65G 1/1371 700/217 |
| 2015/0353282 A1* | 12/2015 | Mansfield | G06Q 10/087 700/214 |
| 2016/0027095 A1* | 1/2016 | Boer | B65G 1/1375 414/800 |
| 2016/0167228 A1* | 6/2016 | Wellman | B25J 9/1602 901/3 |
| 2016/0171707 A1* | 6/2016 | Schwartz | G06F 18/22 382/180 |
| 2016/0176636 A1* | 6/2016 | Kazama | B65G 1/1375 700/214 |
| 2017/0080566 A1* | 3/2017 | Stubbs | G06Q 10/087 |
| 2017/0158431 A1* | 6/2017 | Hamilton | B65G 1/1373 |
| 2017/0260008 A1* | 9/2017 | DeWitt | B65G 1/0485 |
| 2018/0044112 A1* | 2/2018 | Fujiwara | B65G 1/137 |
| 2018/0082244 A1* | 3/2018 | Brazeau | G06T 7/73 |
| 2018/0224837 A1* | 8/2018 | Enssle | G06Q 10/0875 |
| 2019/0073557 A1* | 3/2019 | Matsuda | G06V 10/774 |
| 2019/0122174 A1* | 4/2019 | Gil | G06Q 10/0833 |
| 2019/0233213 A1* | 8/2019 | Phan-Quiroga | B65G 1/0492 |
| 2019/0272491 A1* | 9/2019 | Das | G06Q 10/06313 |
| 2019/0344966 A1* | 11/2019 | Ishii | G06Q 10/087 |
| 2020/0017317 A1* | 1/2020 | Yap | G06Q 10/08 |
| 2020/0122927 A1* | 4/2020 | Bellar | G06Q 10/087 |
| 2020/0130963 A1* | 4/2020 | Diankov | G06T 7/001 |
| 2020/0143315 A1* | 5/2020 | Marquette | G06Q 10/087 |
| 2020/0265380 A1* | 8/2020 | Dubois | G06Q 10/0838 |
| 2020/0302390 A1* | 9/2020 | Elazary | G06Q 30/0633 |
| 2021/0001489 A1* | 1/2021 | Peterson | G06Q 10/08 |
| 2021/0025731 A1* | 1/2021 | Fujishima | B65G 1/1373 |
| 2021/0150463 A1* | 5/2021 | Kim | G06F 16/252 |
| 2021/0241352 A1* | 8/2021 | Stanley | G06Q 10/087 |
| 2021/0276804 A1* | 9/2021 | Peck | G06Q 10/087 |
| 2021/0299706 A1* | 9/2021 | Filler | B07C 5/3416 |
| 2022/0111519 A1* | 4/2022 | Stanton | B25J 15/0061 |
| 2022/0122031 A1* | 4/2022 | Powers | B65B 57/00 |
| 2022/0289502 A1* | 9/2022 | Sun | B25J 9/1697 |
| 2022/0324658 A1* | 10/2022 | Cedarleaf-Pavy | B65G 47/8823 |
| 2022/0366359 A1* | 11/2022 | Liu | B07C 5/36 |

FOREIGN PATENT DOCUMENTS

| | | | |
|---|---|---|---|
| JP | 2015129037 A | * | 7/2015 |
| JP | 2016169080 A | * | 9/2016 |

* cited by examiner

MACHINE LEARNING TECHNIQUES FOR DIRECTED STORAGE GUIDANCE IN INVENTORY BINS OF MOVEABLE INVENTORY HOLDERS

BACKGROUND

Inventory storage systems are deployed in warehouses and other large buildings to stow inventory items. Some inventory storage systems store similar inventory items together, while others comingle inventory items of different sizes and types together into the same storage location (e.g., bin, shelf, tote, etc.).

BRIEF DESCRIPTION OF THE DRAWINGS

Various examples in accordance with the present disclosure will be described with reference to the drawings, in which.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable storage media relating to generating and providing inventory bin recommendations for directed storage guidance. The directed storage guidance may be implemented in an inventory system that includes many moveable inventory holders. A moveable inventory holder may be a three-dimensional moveable shelf that includes multiple sides (e.g., four), each of which includes multiple bins arranged generally in rows and columns and that are capable of receiving and retaining inventory items. The inventory holders described herein may be moveable in the sense that a mobile drive unit including a robotic drive mechanism may be configured to releasably couple with a single inventory holder (e.g., lift it off of the ground) and move the inventory holder to different locations within a warehouse or other facility. Such locations may include a stow station at which human users load the inventory items (e.g., stow) into bins of the inventory holders, pick stations at which human users remove inventory items from the inventory bins (e.g., as part of fulfilling a customer order), and storage areas where inventory holders remain between stowing and picking.

The techniques described herein are directed to machine learning based approaches that improve the stowing process by reducing the cognitive load a human user experiences when trying to decide how to stow dissimilar items within inventory bins of moveable inventory holders. In particular, rather than requiring the human user to guess which bin might be the best for a given item, the techniques described herein consider the context of the inventory holder (e.g., which items are in the inventory holder and how they are distributed among the inventory bins), information about the inventory item (e.g., dimensions, storage rules, etc.), and, in some examples, various other parameters relating to storing items in the inventory holders. A machine learning model considers the context of the inventory holder and the specific item to be stowed and computes a set of relevancy storage scores for each inventory bin (e.g., one or more bins in the inventory holder that would be suitable for storing the inventory item). The relevancy storage scores can then be thresholded to define a candidate set of bins (e.g., the top five bins, the bins with scores above a certain score threshold, etc.). The machine learning model is trained using a binary classification approach that is unsupervised, which approximates probabilities for each inventory bin that an average historical human user would stow the inventory item in each respective inventory bin. For example, because annotated data about what constituted a "correct" item location in a particular inventory bin is unknown, the machine learning model is presented with datasets that represent the same choices (e.g., an item, available bins, and selected bin) presented to human users, and the machine learning model is trained to compute probabilities that the human user would choose each inventory bin.

Once the inventory bins have been identified, visual cues that identify the inventory bins may be presented to the human user. For example, the visual cues, in the form of light, can be projected directly on the inventory holder so as to "light up" the candidate inventory bins. Alternatively or in addition, the visual cues can be presented as user interface elements on a display mounted adjacent to the inventory holder. For example, the user interface elements may represent "marked up" regions of a user interface element that represents the inventory bins of the inventory holder.

Turning now to a particular example, in this example is provided an inventory storage system that includes moveable inventory holders, a stow station including a scanner device and a projector, and a directed storage assistance system. The directed storage assistance (DSA) system collects data from various sources within the inventory storage system, which is then used by the DSA system to determine properties of a particular moveable inventory holder. For example, the DSA system may derive a context of a set of inventory items within the particular moveable inventory holder (e.g., distribution of what items are in which bins of the inventory holder). This information can be precomputed asynchronously and cached for later use when the particular moveable inventory holder is presented at the stow station.

To begin a directed storage assistance workflow, a user may scan the item using the scanner device (e.g., an optical scan of a barcode, etc.). Information about the scan can be shared with the DSA system, which, along with information about the particular moveable inventory holder, is input into a machine learning model of the DSA system. The machine learning model outputs storage relevancy scores for each bin in the particular moveable inventory holder. A storage relevancy score represents suitability of the particular bin for stowing the particular item (e.g., a probability that an average user would stow the particular item into the particular bin). The storage relevancy scores are used to determine a set of bins to highlight, and highlighting is performed by projecting structured light onto the set of bins in the moveable inventory holder. In this manner, the user's attention is drawn to these bins as candidates for stowing the inventory item. Once the inventory item has been stowed, information about the storage event can be recorded and used when making future predictions. Once the user scans a next item, the workflow is repeated for the specific item, which may include highlighting the same or different bins.

Examples of the present disclosure provide various technological advantages over a conventional computer system. For example, conventional approaches may rely entirely on human judgment, may rely on heuristic models, and/or some combination of the foregoing. The heuristic models are less accurate than the machine learning models described herein and fail to account for various "human" factors that a user considers when deciding to stow an item. For example, the user may prefer to stow a next item in the same bin as a previous item, may prefer to stow items in a certain part of a moveable inventory holder (e.g., the middle third along the height), may prefer to stow certain types of items together, and other such factors such as compressibility, stackability, orientation, co-locatability, etc. Additionally, relying on heuristic models may fail to account for other factors such as expected storage length (e.g., how long the inventory item is expected to stay in the inventory holder). The machine learning model described herein has been trained using real data of real users who stowed real items under normal circumstances. Thus, the model can accurately and efficiently provide directed storage assistance for experienced users and new users alike.

In addition, conventional approaches that require users to choose a suitable bin for an item, may be acceptable for experienced users, but may require too high of a cognitive load for new users. The techniques described herein significantly reduce the cognitive load by providing recommendations for the user to pick from, rather than having to evaluate each and every inventory bin. Such reduction in cognitive load may also improve user performance, improve stow rates, improve quality by reducing process defects, improve safety through reduction of bending and reaching to stow in more difficult bins, and increase bin utilization.

Figure 1:
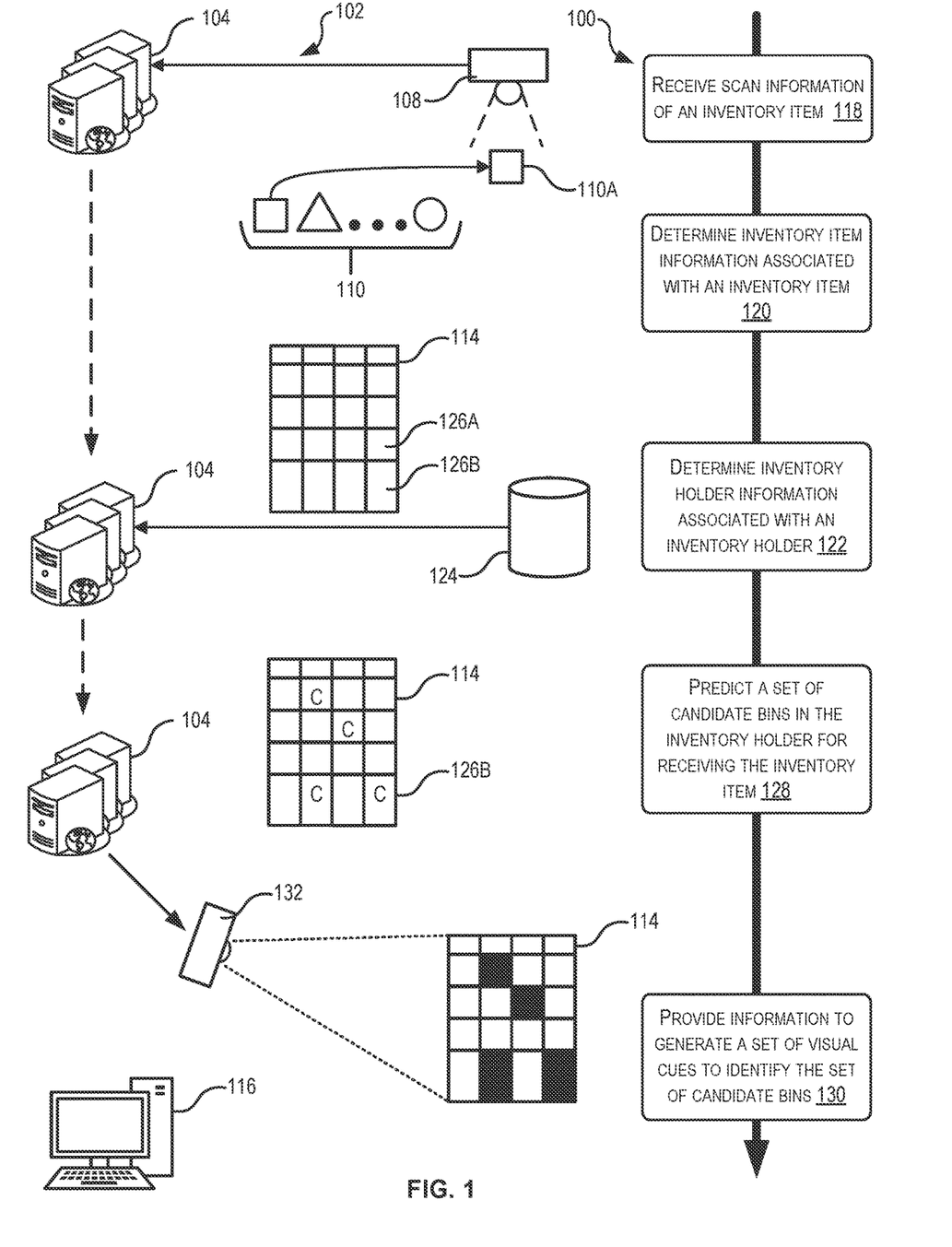
FIG. 1 illustrates a block diagram and a flowchart showing an example process for generating and providing inventory bin recommendations for directed storage guidance, according to at least one example.

Turning now to the figures, FIG. 1 illustrates a block diagram 102 and a flowchart showing an example process 100 for generating and providing inventory bin recommendations for directed storage guidance, according to at least one example. The diagram 102 includes a DSA system 104 and other elements within an inventory storage system. As described in further detail with respect to FIGS. 2 and 3, the DSA system 104 is any suitable combination of computing devices such as one or more server computers, which may include virtual resources, services, and the like capable of performing the functions described with respect to the DSA system 104. In some examples, components of the DSA system 104 may be distributed between a server (e.g., a cloud-based virtual instance) and a local computer. Generally, the DSA system 104 is configured to generate directed storage guidance in the form of inventory bin recommendations for directed storage guidance.

The diagram 102 also includes a scanner device 108, which may be any suitable optical or non-optical scanner, capable of scanning identifying information associated with inventory items 110. A user may user the scanner device 108 to scan the inventory items 110. The diagram 102 also includes a projection device 112. The projection device 112 may be any suitable light-based projector capable of projecting information on a face of a moveable inventory holder 114 including a plurality of inventory bins 126. In some examples, the scanner device 108 and the projection device 132 may operate under the control of a station computing device 116, which may be any suitable device including a processor, memory, input/output controls, display, and the like for performing the functions described herein. The station computing device 116 may be located at a station, such as a stow station, and may communicate with the DSA system 104 using any conventional technique (e.g., via any suitable network connection) in order to perform the techniques described herein. The station computing device 116, the scanner device 108, and the projection device 112 may be part of the inventory storage system and may be in network communication with the DSA system 104.

Figure 6:
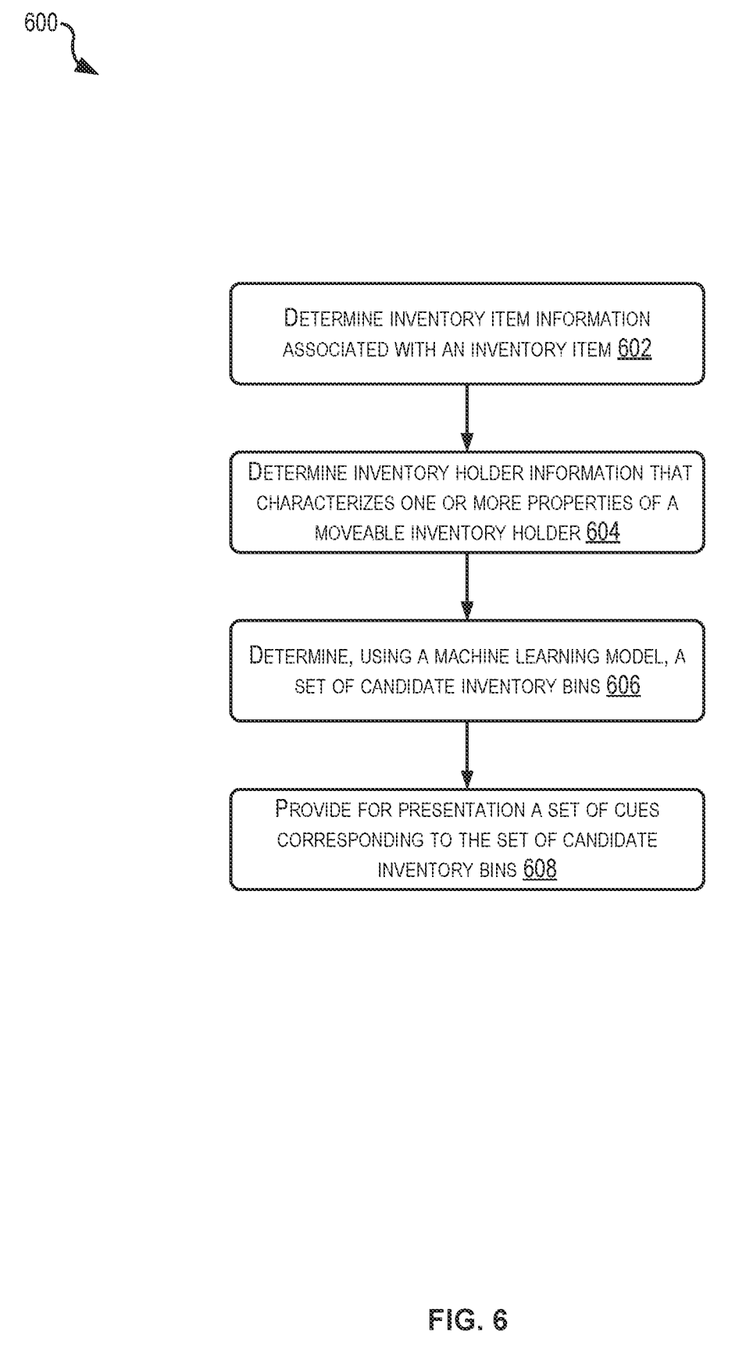
FIG. 6 illustrates a flowchart showing an example process for generating and providing inventory bin recommendations for directed storage guidance, according to at least one example.

FIGS. 1 and 6 illustrate example flow diagrams showing processes 100 and 600, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 begins at 118 by the DSA system 104 receiving scan information of an inventory item 110A. In some examples, the scanner device 108 may have collected the scan information, as a user places the inventory item 110A within a scanning field of the scanner device 108. The user may have picked the inventory item 110A from a set of different inventory items 110. In some examples, the DSA system 104 may receive an indication of which items 110 are in included in the set of different inventory items 110. This may be desirable so that the DSA system 104 can consider the next items to be stowed, while also making directed storage guidance for the inventory item 110A.

In any event, the scanner device 108 may send the scan information (about the inventory item 110A) directly to the DSA system 104, or, in some examples, the station computing device 116 may receive the scan information and send it to the DSA system 104. For example, the station computing device 116 may report a scan event to the DSA system 104. The scan event may include an inventory item identifier (e.g., a stock keeping unit, a barcode, a global trade item number, etc.) that is unique to the item type of the inventory item 110A. In some examples, the station computing device 116 may report additional events to the DSA system 104, including, for example, an assigned container event (e.g., to report when a container of items 110 (e.g., a container that holds the different inventory items 110) arrives at the station), and a mobile inventory holder event (e.g., to report when the moveable inventory holder 114 arrives at the station). In some examples, the station computing device 116 may also send a request for directed storage guidance to the DSA system 104 together with the scan information or as part of a separate transmission.

At block 120, the process 100 includes the DSA system 104 determining inventory item information associated with the inventory item 110A. This may include accessing a database of item information maintained by the DSA system 104 or by a different system. In some examples, this may include an application programming interface (API) or similar function call to an internal service that maintains such information. In some examples, the inventory item information may include dimensions, weight, description, storage rules, expected time to be stored, and any other suitable property.

At block 122, the process 100 includes the DSA system 104 determining inventory holder information associated with the moveable inventory holder 114. In some examples, this may include determining the inventory holder information on the fly, e.g., once the particular moveable inventory holder 114 has been identified or may include accessing a service, database 124 or the like that maintains such information. In some examples, the inventory holder information may be precomputed and block 122 may include accessing the precomputed information. The inventory holder information may describe the context of the moveable inventory holder 114, such as what items are currently in the moveable inventory holder 114 and within which inventory bins 126. For example, the inventory holder information may include a bin X position (e.g., X position of the bin from the left most end of the moveable inventory holder 114), a bin Y position (e.g., Y position of the bin from the top most end of the pod), sum of minimum dimensions of all items present in the bins, item category product name, sum or minimum dimensions of all items present in the bins, and number of duplicates of scanned items in the current assigned container. As each inventory bin 126 may be configured to hold more than one item 110, the inventory holder information may be capable of representing these complex relationships between items and bins. The inventory holder information may also represent other properties of the moveable inventory holder 114 such as available volume in each bin, dimensions of available volume, and the like.

At block 128, the process 100 includes the DSA system 104 predicting a set of candidate inventory bins 126 in the moveable inventory holder 114 for receiving the inventory item 110A. In some examples, this may include using a machine learning model to compute a storage relevancy score for each bin, which represents suitability of storing the inventory item 110A within the particular inventory bin 126. For example, the set of candidate bins are represented in FIG. 1 by the letter "C". Using the machine learning model may include inputting attributes from the inventory item information and/or the inventory holder information.

At block 130, the process 100 includes the DSA system 104 providing information to generate a set of visual cues to identify the set of candidate bins. In some examples, this may include the DSA system 104 providing information that identifies the top candidate bins. The station computing device 116 may use the provided information to cause a projection device 132 disposed at the station to project the visual cues (e.g., structured light that identifies the set of candidate bins), as represented as the black boxes on the moveable inventory holder 114 in FIG. 1. After the inventory bins 126 have been identified, the user may stow the inventory item 110A into one of the identified bins 126. Information about the storage event may be saved and shared with downstream processing systems.

In some examples, the DSA system 104 or a different system may determine a set of excluded bins 126 for the inventory item 110A. This may include bins 126 that are unsuitable for receiving the inventory item 110A. For example, certain items may be unsafe to store near each other, may result in degradation of one of the inventory items, etc. In some examples, the projection device 132 may also be used to project visual cues that identify the excluded bins (e.g., negative hints). These visual cues may be presented in a different color than the visual cues that identify the candidate bins.

Figure 2:
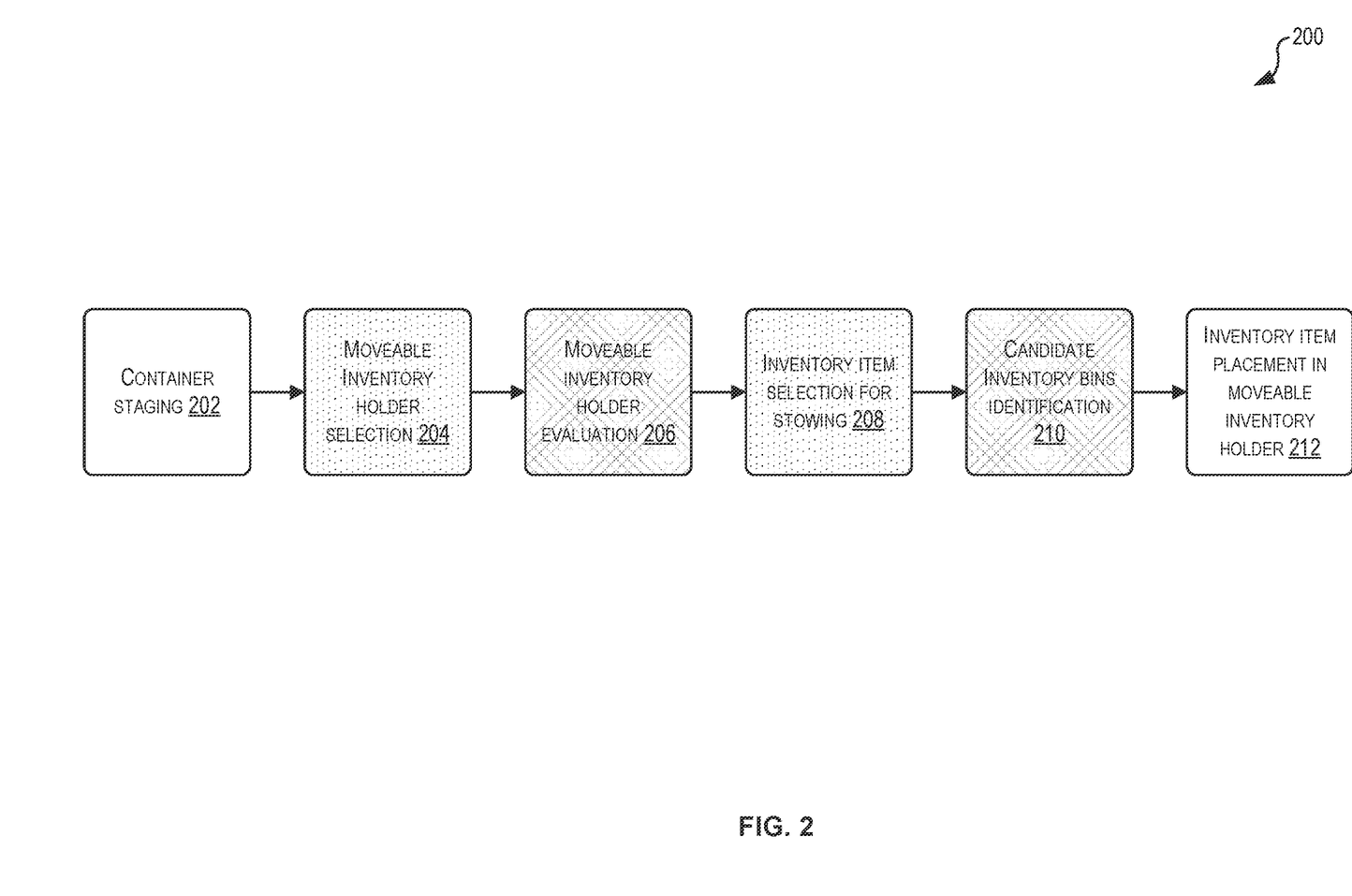
FIG. 2 illustrates a block diagram showing an example workflow for generating and providing inventory bin recommendations for directed storage guidance, according to at least one example.

FIG. 2 illustrates a block diagram showing an example workflow 200 for generating and providing inventory bin recommendations for directed storage guidance, according to at least one example. The workflow 200 generally may represent a set of operations that are performed as part of storing an item in an inventory system. Operations 202 and 212 are not under control of the DSA system 104. Operations 204 and 208 are influenced by the DSA system 104 and, in some examples, may be performed under control of the DSA system 104. Operations 206 and 208 are performed under control of the DSA system 104.

Figure 4:
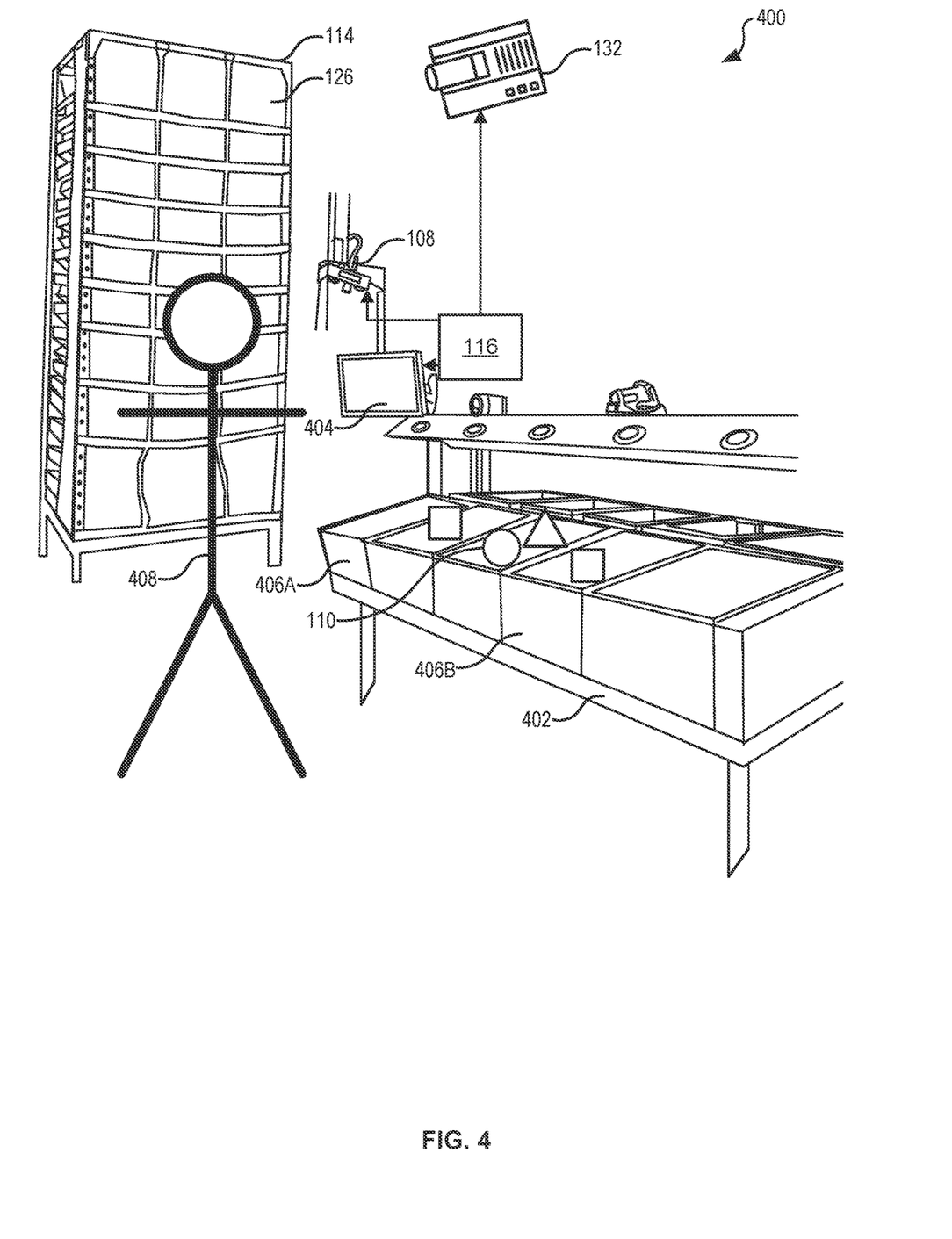
FIG. 4 illustrates an example inventory stow station at which techniques relating to generating and providing inventory bin recommendations for directed storage guidance may be implemented, according to at least one example.

As FIG. 2 references aspects of an inventory stow station, the discussion will now turn to FIG. 4 in which is illustrated an example inventory stow station 400 at which techniques relating to generating and providing inventory bin recommendations for directed storage guidance may be implemented, according to at least one example. The inventory stow station 400 may include a container rack 402, the moveable inventory holder 114, the station computing device 116, the scanner device 108, the projection device 132, and a display 404. The container rack 402 may be configured to support one or more containers 406 (e.g., a few of which are labeled).

Container staging operation 202 includes moving containers 406 full of items 110 to the inventory stow station 400. In some examples, some level of sorting may be performed on the inventory items 110 before placing them into the containers 406 (e.g., size, type, etc.). In some examples, information about the inventory items 110 in the containers 406 may be stored in association with a profile of a user 408 tasked with storing the inventory items 110 into the moveable inventory holder 114.

Moveable inventory holder selection operation 204 includes picking the moveable inventory holder 114 to send to the inventory stow station 400 based on the information stored in association with the profile of the user 408. This operation 204 may attempt to find the best inventory holder 114 for the inventory items in the containers 406 currently at the inventory stow station 400 or that will soon be at the inventory stow station 400. In some examples, one or more inventory holder allocation algorithms may be executed to perform operation 204. This may include an inventory holder planner selecting a seed item (item with most quantity of a selected bin template), attempting to find all inventory item faces containing bins that have enough space to fit the seed item, and then scoring the inventory bins from selected faces based on how many additional items can be stowed from the list of items stored in association with the user's profile. Relevancy storage scores may then be normalized by available volume and by distance from the inventory stow station 400. In some examples, a service may rank inventory item faces for a given user and template in descending order of how much volume will be stowed to them. For bins that are smaller than 12", the ranking decisions may also take into consideration the historical stowing transactions of the particular seed item being stowed and the user's past behavior with that specific item and other items (preferences based on bin parameters like cubic free space, linear free space, total items, unique items, and vertical/horizontal position). For bins that are larger than 12", the ranking decisions may be solely based on volumes and distance to the inventory stow station 400.

Although the DSA system 104 may focus on operations that follow operation 204, the DSA system 104 can help improve the pod allocation algorithm through the identification of more valuable factors or more accurate bin and item information.

Moveable inventory holder evaluation operation 206 includes the DSA system 104 evaluating the moveable inventory holder 114 to determine a context of the moveable inventory holder 114. This operation may be performed asynchronously such as before runtime.

Inventory item selection for stowing operation 208 includes the user 408 picking an inventory item 110 from the containers 406 to stow in the moveable inventory holder 114. In some examples, the user 408 may scan the inventory item 110 using the scanner device 108 as part of operation 208. In some examples, the DSA system 104 may suggest to the user 408 which item 110 to select. For example, the DSA system 104 may evaluate the inventory items in the container at, before, or after the container staging operation 202. The DSA system 104 may then, with knowledge of the moveable inventory holder 114 from the operation 206, determine a mapping of items 110 to the inventory bins 126. In some examples, this mapping may also include an ordered sequence for the inventory items 110.

The candidate inventory bins identification operation 210 includes using the DSA system 104 to identify one or more appropriate bins for the inventory item selected at operation 208. This may include using the machine learning model described herein to score each bin in the moveable inventory holder 114 and picking one or more bins with the highest relevancy storage scores.

The inventory placement in the moveable inventory holder operation 212 may include the user 408 placing the inventory item 110 into the moveable inventory holder 114 within one of the inventory bins identified at operation 210.

Figure 3:
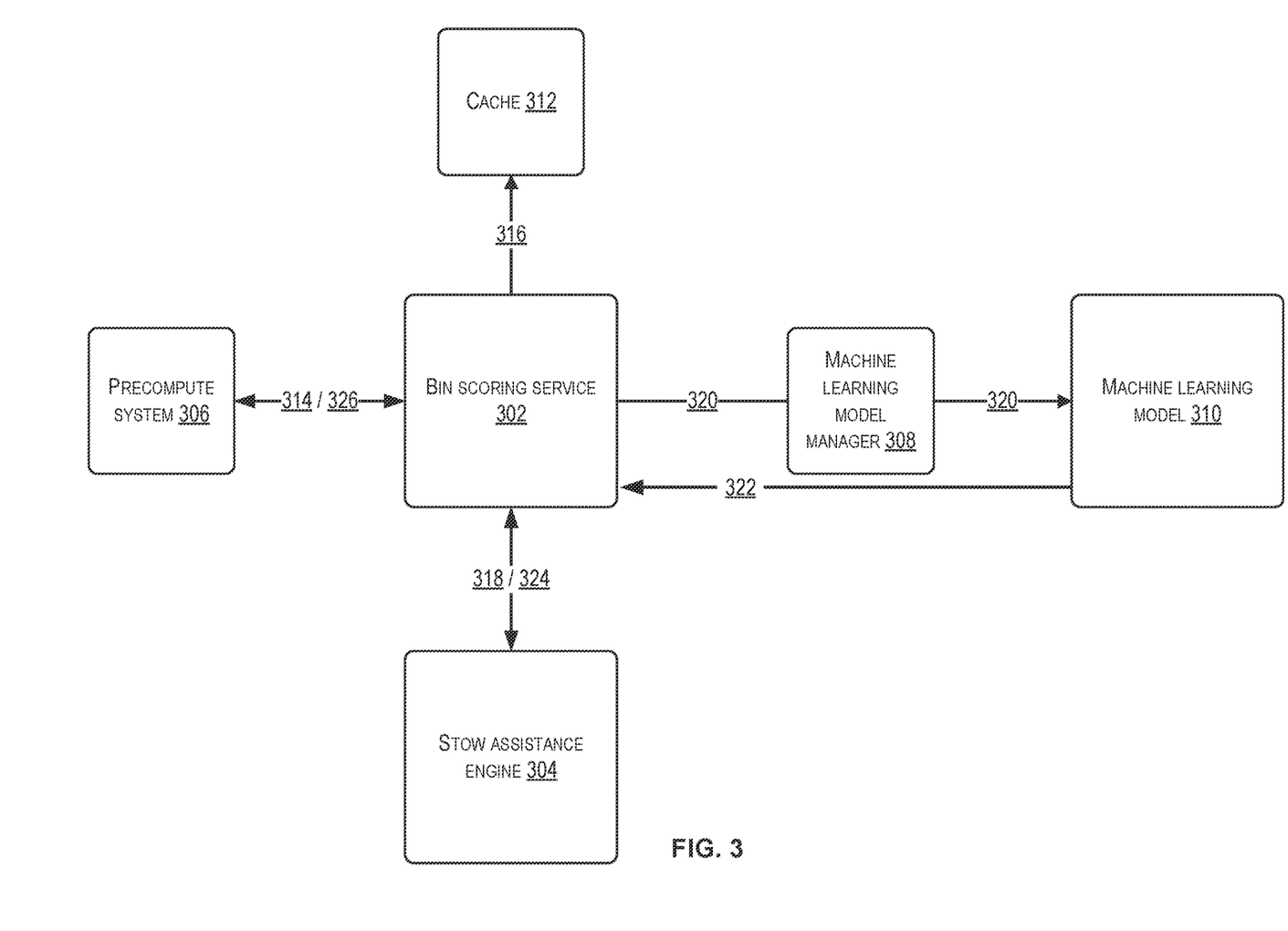
FIG. 3 illustrates a block diagram showing an example system for generating and providing inventory bin recommendations for directed storage guidance, according to at least one example.

FIG. 3 illustrates a block diagram showing an example system 300 for generating and providing inventory bin recommendations for directed storage guidance, according to at least one example. The system 300 is a DSA system (e.g., the DSA system 104). The system 300 includes a bin scoring service 302, a stow assistance engine 304, a precompute system 306, a machine learning model manager 308, a machine learning model 310, and a cache 312.

The precompute system 306 is configured to compute an initial context for a moveable inventory holder 114, compute an initial context for containers 406 at the inventory stow station 400, and compute an initial context for the inventory items 110 within the containers 406. In some examples, the precompute system 306 may include a set of existing services that may be accessed by the bin scoring service 302 prior to run-time. For example, the bin scoring service 302, at 314, may request information about the moveable inventory holder 114, request information about attribute values for a set of items 110 in the moveable inventory holder, and request information about attribute values for a set of items 110 in the containers 406. The bin scoring service 302 may use the information from the precompute system 306 to generate contextual information (e.g., item information, moveable inventory holder information, and container information), which may be stored, at 316, in the cache 312. In some examples, the precompute system 306 generates the contextual information and provides the contextual information to the bin scoring service 302, at 326. At 316, the bin scoring service 302 may store the accessed and generated information in the cache 312. In some examples, the cache 312 may be configured to store session data for a current inventory holder at a current inventory stow station 400.

The stow assistance engine 304 may be executed in the station computing device 116 and/or as part of the DSA system 104. The stow assistance engine 304 may notify the bin scoring service 302 of certain events, at 318, such as item scan events, container switch events, inventory holder transition events, and stow events. Each scan event may include any suitable data stored in any suitable data structure to convey the represent the properties of the event. For example, an inventory item scan event may include an identifier of an inventory item, a timestamp, an identifier of the station, and the like. The bin scoring service 302 may, at 320, request relevancy storage scores from the machine learning model manager 308 and the machine learning model 310. The bin scoring service 302 may provide the inventory item information from the stow assistance engine 304 and the contextual information for the moveable inventory holder from the cache 312 and/or the precompute system 306 to the machine learning model manager 308 so that the machine learning model 310 can generate a set of relevancy storage scores for the inventory bins. These relevancy storage scores can be shared with the bin scoring service 302, at 322. The bin scoring service 302 may then share the relevancy storage scores for the bins with the stow assistance engine 304, at 324. The stow assistance engine 304 may then generate visual cues to identify the relevant bins on the face of the inventory holder.

Additional aspects of the machine learning model 310 will now be described. The objective of training was to design a trainable function, R ([B;I]), that returns a relevancy storage score for a bin-item pair that is proportional to the probability that a user chooses bin B for stowing item I. Once a relevance function was learned, the machine learning model 310 can recommend K bins that are good candidates for stowing an inventory item/by scoring combination of the inventory item/and all the available bins, arranging the combinations in the descending order of the relevancy storage score and selecting top K bins from that set. There was no access to the ground truth optimal order of the suitable bins in the pod for the stow of an inventory item. The assumption is that for a given item, there is a subset of bins in the inventory holder, which are good candidates for stowing that item and the users use their understanding of stow best practices to choose one among the good candidates. Information about the chosen bin was available, but not the latent good subset. Due to this constraint, the problem was framed as a binary classification problem. The machine learning model 310 is presented with the same choices that the user had and the model 310 learns to choose the inventory bin the user would have chosen.

It is expected that there will be sufficient redundancy in the data because different users place the same item in different bins based on their judgement while generally following stow etiquette. It is expected that this redundancy will help the machine learning model 310 identify generic properties of a suitable bin and score them higher than unsuitable bins. The relevance scoring function may be modeled as a binary classifier (C) which, given a stow event, (I, $B^+$, $PC_-$) learns to predict $C([B^+;I]) \rightarrow$ True and $C([B^-; I]) \rightarrow$ False for $B^- \sim PC_-$, $\sim$ denotes sampling operator.

During training, tuples (I, $B^+$, $PC_-$) were used that correspond to 0.8-1.2 million stow events generated from a random selection of 80 to 150 thousand inventory holder visits over an eight-month period. Each tuple, with represents a stow event, was transformed into a set of two training datapoints in the (X, y) format suitable for classification, $\{([B^+;I], 1), ([B^-;I], 0)\}$. The target, y=1 for the chosen bin $B^+$ for item I and target, y=0 for a randomly selected bin from $PC_-$. The negative sample was biased by choosing from those bin states which were not chosen despite having sufficient volume.

At runtime, for the stow of item/to decide whether to recommend a candidate bin B from a set of candidate bins the machine learning model 310 uses the relevancy storage score C ([B;I]), and compare it to scores generated for other candidate bins with the same item. In some examples, XGBoost algorithm in Amazon Sagemaker may be used with hyper-parameter tuning for training.

Returning to FIG. 4, this figure illustrates that the inventory stow station 400 may also include the display 404 in communication with the station computing device 116. As shown, the station computing device 116 may also be in communication with the scanner device 108 and the projecting device 132. In some examples, the scanner device 108 may be positioned to enable quick scanning of the inventory items 110 by the user 408. The projecting device 132 may be positioned to project light onto the face (e.g., a side that includes bins 126) of the moveable inventory holder 114. The projecting device 132 may be capable of projecting any suitable colors in any suitable designs. For example, as shown in more detail in FIG. 5, the projecting device 132 may project individual square shapes that correspond in size and shape to the inventory bins 126.

Figure 5:
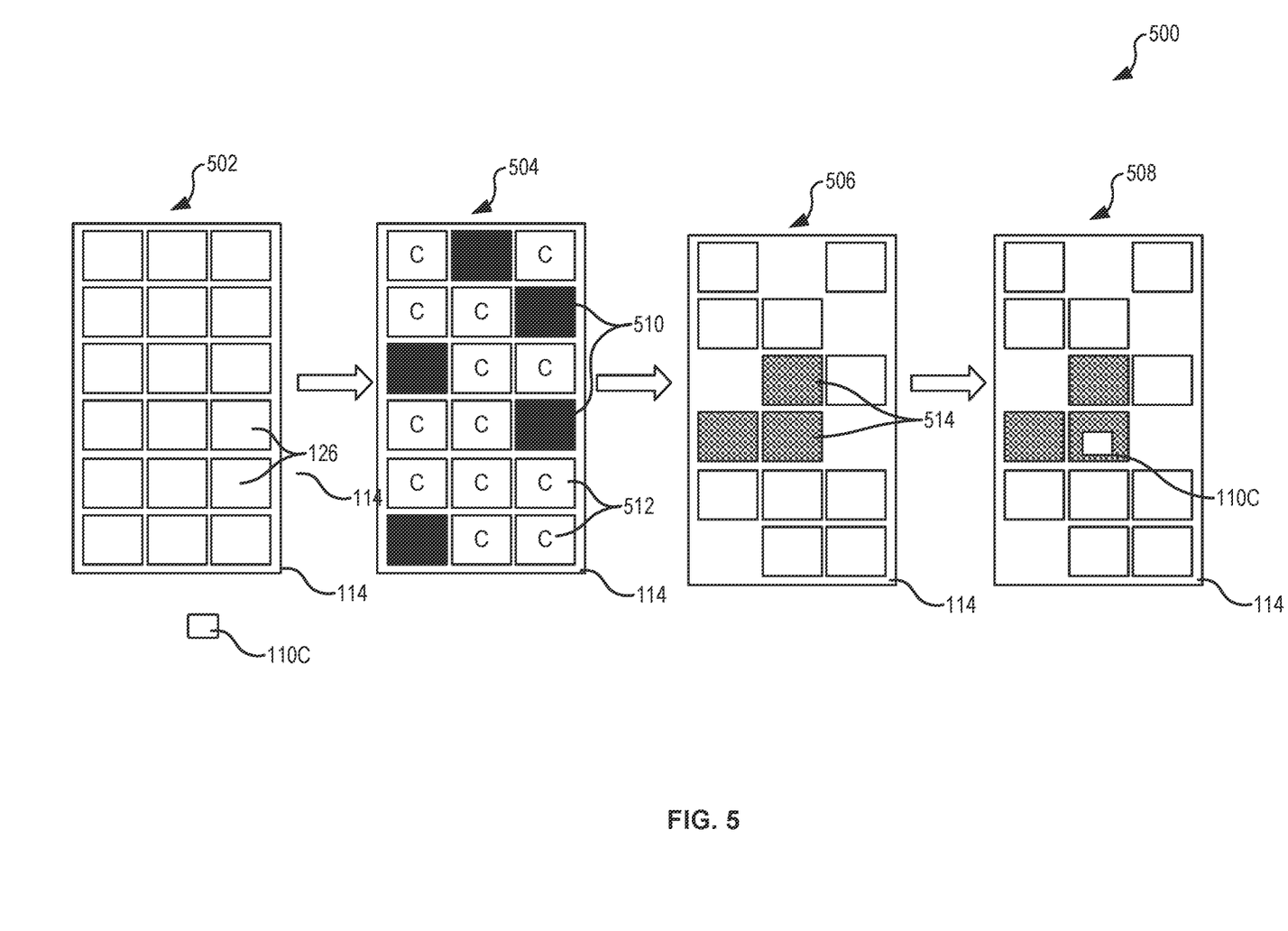
FIG. 5 illustrates a diagram showing conceptual views of one side of a moveable inventory holder, according to at least one example.

FIG. 5 illustrates a diagram 500 showing conceptual views 502 to 508 of one side of a moveable inventory holder 114, according to at least one example. As illustrated, the moveable inventory holder 114 may include an M×N array of bins 126. In some examples, the sizes of the inventory bins 126 may vary between the various columns and rows. In some examples, larger bins 126 may be disposed near the bottom of the moveable inventory holder 114 and smaller bins 126 may be disposed near the top of the moveable inventory holder 114.

The conceptual view 502 represents an initial state, e.g., prior to any bin scoring relating to stowing the inventory item 110C. Thus, all bins 126 are illustrated on the moveable inventory holder 114. Between the conceptual view 502 and the conceptual view 504, two events have occurred. First, a set of excluded bins 510 have been identified as being unsuitable/incompatible for stowing the inventory item 110C. The excluded bins 510 may be visually identified using a first type of visual cue (e.g., magenta, or other color overlay) that is projected on top of the excluded bins 510, depicted as black boxes. Second, a set of potential candidate bins 512 have been identified using the DSA system 104 described herein. These bins are potential candidates for stowing the inventory item 110C simply because they are not in the excluded set. The conceptual view 506 shows results of the DSA system 104 after the DSA system 104 has scored the potential candidate bins 512, ranked the potential candidate bins 512 as per the probability that an average user would choose these bins to stow the inventory item 110C, and selected some top number of the inventory bins as a final set of candidate bins 514. The final set of candidate bins 514 may be visually identified using a second type of visual cue (e.g., a white or other color overlay) that is projected on top of the final set of candidate bins 514. In the conceptual view 508, the user has selected one of the final sets of candidate bins 514 as the storage location for the inventory item 110B.

FIG. 6 illustrates a flowchart showing an example process 600 for generating and providing inventory bin recommendations for directed storage guidance, according to at least one example. The DSA system 104 (FIG. 1 and 300 in FIG. 3) in connection with the station computing device 116 (FIG. 1) may perform aspects of the process 600. In some examples, the function of the DSA system 104 and the station computing device 116 are consolidated within one or the other or may be distributed between the two.

The process 600 begins at block 602 by the DSA system 104 determining inventory item information associated with an inventory item. The inventory item may be one that is to be stowed in an inventory system that includes a plurality of moveable inventory holders. In some examples, the inventory item information may include item attributes of the inventory item.

At block 604, the process 600 includes the DSA system 104 determining inventory holder information that characterizes one or more properties of a moveable inventory holder. The moveable inventory holder may be one of the plurality of moveable inventory holders. The moveable inventory holder may include a plurality of inventory bins each configured to hold one or more inventory items. In some examples, at least some of the plurality of inventory bins may already include inventory items. Thus, the inventory holder information may characterize these items and their locations within the moveable inventory holder. In some examples, the inventory holder information may include attributes such as a bin X position (e.g., X position of the bin from the left most end of the moveable inventory holder 114), a bin Y position (e.g., Y position of the bin from the top most end of the pod), sum of minimum dimensions of all items present in the bins, item category product name, sum or minimum dimensions of all items present in the bins, and number of duplicates of scanned items in the current assigned container. In some examples, determining inventory holder information may include receiving a set of precomputed bin rankings that rank the plurality of inventory bins of the moveable inventory holder.

At block 606, the process 600 includes the DSA system 104 determining, using a machine learning model, a set of candidate inventory bins. The set of candidate inventory bins may be some of the plurality of inventory bins. The determining at block 606 may be based on the inventory item information and the inventory holder information being input into the machine learning model as attributes. In some examples, the machine learning model may approximate how an average user would stow the inventory item, given the current context of the inventory items in the inventory bins in the moveable inventory holder.

In some examples, determining, using the machine learning model, the set of candidate inventory bins may include computing a score for each inventory bin of the plurality of inventory bins, ranking each inventory bin of the plurality of inventory bins using a respective score to define a ranked set of inventory bins, and selecting the set of candidate inventory bins by applying a threshold to the ranked set of inventory bins. In some examples, the threshold may be a score-based threshold (e.g., top 50%, top 75%, etc.) or may be a predefined numerical quantity threshold (e.g., top five bins).

In some examples, the machine learning model may output relevancy scores between the inventory item and each of the plurality of inventory bins. In some examples, generating the candidate inventory bin information may include generating the candidate inventory bin information based at least in part on the relevancy scores for a subset of the plurality of inventory bins.

At block 608, the process 600 includes the DSA system 104 providing for presentation a set of cues corresponding to the set of candidate inventory bins. In some examples, the providing may include providing instructions for a station computing device to present the visual cues using a projection device. In some examples, the set of cues are visual cues. In some examples, providing at block 608 includes providing the set of cues for projection onto one side of the moveable inventory holder that includes the plurality of inventory bins. In some examples, the process 600 may further include determining a set of excluded candidate inventory bins that are distinct from the set of candidate inventory bins and providing a set of negative hints for projection onto the one side of the moveable inventory holder, the set of negative hints identify the set of excluded candidate inventory bins.

The process 600 may further include receiving, from a scanner system, scan information that identifies the inventory item to be stowed in one of the plurality of moveable inventory holders. In this example, the inventory item information may be determined based on the scan information.

In some examples, the machine learning model may model historical stow behavior of a set of historical users who stowed historical inventory items into historical inventory bins of historical moveable inventory holders.

In some examples, the one or more inventory holder properties may represent a current state of the moveable inventory holder, which may correspond to a context of the moveable inventory holder. The current state may be dependent on a distribution of current inventory items currently stowed among the plurality of inventory bins.

In some examples, the process 600 may further include registering placement of the inventory item into a candidate bin of the set of candidate inventory bins, and updating the inventory holder information based at least in part on the placement. In some examples, the process 600 may further include determining new inventory item information associated with a new inventory item, determining, using the machine learning model, a new set of candidate inventory bins of the plurality of inventory bins based on the new inventory item information and the updated inventory holder information, and providing for presentation a new set of cues corresponding to the new set of candidate inventory bins.

In some examples, the process 600 may further include determining new inventory item information associated with a new inventory item, determining, using the machine learning model, a new set of candidate inventory bins of the plurality of inventory bins based on the new inventory item information and the inventory holder information, and providing for presentation a new set of cues corresponding to the new set of candidate inventory bins.

Figure 7:
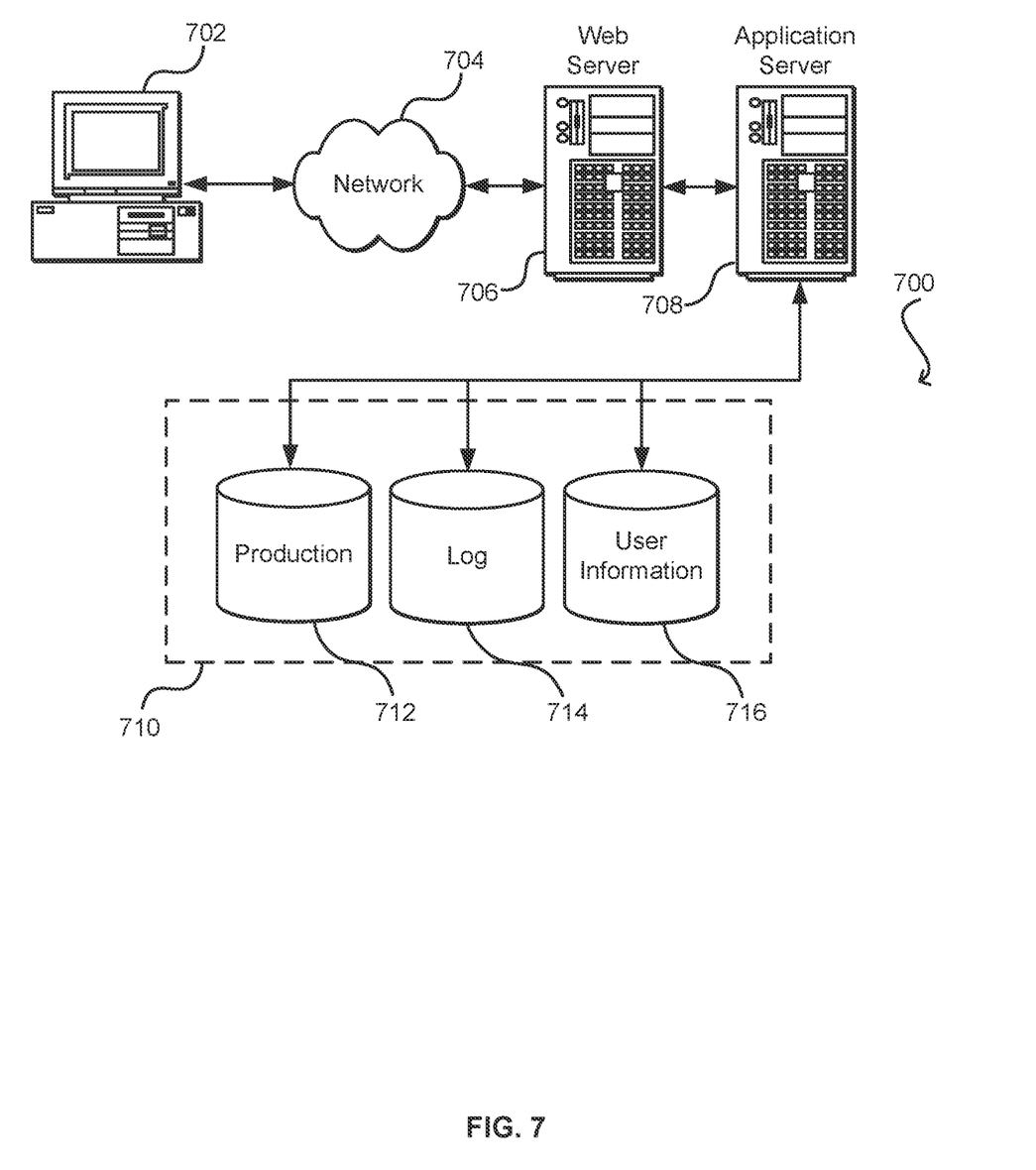
FIG. 7 illustrates an environment in which various examples can be implemented.

FIG. 7 illustrates aspects of an example environment 700 for implementing aspects in accordance with various examples. As will be appreciated, although a Web-based environment is used for purposes of explanation, different environments may be used, as appropriate, to implement various examples. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 702. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 706 or other servers over the network 704 or other networks.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory system, comprising:
   a plurality of moveable inventory holders;
   a projection system;
   a scanner system; and
   a computer system operably coupled with the projection system and the scanner system, the computer system configured to:
      receive, from the scanner system, scan information that identifies an inventory item to be stowed in a moveable inventory holder of the plurality of moveable inventory holders;
      responsive to receiving the scan information, determine inventory item information associated with the inventory item;
      determine inventory holder information that characterizes one or more inventory holder properties of a moveable inventory holder of the plurality of moveable inventory holders, the moveable inventory holder comprising a plurality of inventory bins;
      determine, using a machine learning model, a set of candidate inventory bins of the plurality of inventory bins using the inventory item information and the inventory holder information as input into the machine learning model;
      present, using the projection system, a set of visual cues corresponding to the set of candidate inventory bins;
      register placement of the inventory item into a candidate bin of the set of candidate inventory bins; and
      update the inventory holder information based at least in part on the placement.

2. The inventory system of claim 1, wherein the machine learning model models historical stow behavior of a set of historical users who stowed historical inventory items into historical inventory bins of historical moveable inventory holders.

3. The inventory system of claim 1, wherein the one or more inventory holder properties represent a current state of the moveable inventory holder.

4. The inventory system of claim 3, wherein the current state is dependent on a distribution of current inventory items currently stowed among the plurality of inventory bins.

5. The inventory system of claim 1, wherein determining, using the machine learning model, the set of candidate inventory bins comprises:
  computing a score for each inventory bin of the plurality of inventory bins;
  ranking each inventory bin of the plurality of inventory bins using a respective score to define a ranked set of inventory bins; and
  selecting the set of candidate inventory bins by applying a threshold to the ranked set of inventory bins.

6. The inventory system of claim 5, wherein the threshold comprises a score-based threshold or a predefined numerical quantity threshold.

7. A computer-implemented method, comprising:
  determining inventory item information associated with an inventory item to be stowed in an inventory system that comprises a plurality of moveable inventory holders;
  determining inventory holder information that characterizes one or more properties of a moveable inventory holder of the plurality of moveable inventory holders, the moveable inventory holder comprising a plurality of inventory bins;
  determining, using a machine learning model, a set of candidate inventory bins of the plurality of inventory bins based on the inventory item information and the inventory holder information;
  providing for presentation a set of cues corresponding to the set of candidate inventory bins;
  registering placement of the inventory item into a candidate bin of the set of candidate inventory bins; and
  updating the inventory holder information based at least in part on the placement.

8. The computer-implemented method of claim 7, wherein the set of cues are visual cues.

9. The computer-implemented method of claim 8, providing for presentation the set of cues comprises providing the set of cues for projection onto one side of the moveable inventory holder that includes the plurality of inventory bins.

10. The computer-implemented method of claim 9, further comprising:
  determining a set of excluded candidate inventory bins that are distinct from the set of candidate inventory bins; and
  providing a set of negative hints for projection onto the one side of the moveable inventory holder, the set of negative hints identifying the set of excluded candidate inventory bins.

11. The computer-implemented method of claim 7, wherein determining inventory holder information comprises receiving a set of precomputed bin rankings that rank the plurality of inventory bins of the moveable inventory holder.

12. The computer-implemented method of claim 7, wherein the inventory item information comprises item attributes of the inventory item.

13. The computer-implemented method of claim 7, further comprising receiving scan information that identifies the inventory item, and wherein determining the inventory item information is responsive to receiving the scan information.

14. The computer-implemented method of claim 7, further comprising:
  determining new inventory item information associated with a new inventory item;
  determining, using the machine learning model, a new set of candidate inventory bins of the plurality of inventory bins based on the new inventory item information and the updated inventory holder information; and
  providing for presentation a new set of cues corresponding to the new set of candidate inventory bins.

15. One or more non-transitory computer-readable media comprising computer-executable instructions that, when executed by one or more processors of a computer system, cause the computer system to perform operations comprising:
  determining inventory item information associated with an inventory item to be stowed in an inventory system that comprises a plurality of moveable inventory holders;
  determining inventory holder information that characterizes one or more properties of a moveable inventory holder of the plurality of moveable inventory holders, the moveable inventory holder comprising a plurality of inventory bins;
  generating, using a machine learning model, candidate inventory bin information that represents at least one candidate inventory bin of the plurality of inventory bins based on the inventory item information and the inventory holder information;
  providing a visual cue for presentation on the moveable inventory holder, the visual cue identifying the at least one candidate inventory bin;
  registering placement of the inventory item into the at least one candidate bin; and
  updating the inventory holder information based at least in part on the placement.

16. The one or more non-transitory computer-readable media of claim 15, wherein the machine learning model outputs relevancy scores between the inventory item and each of the plurality of inventory bins.

17. The one or more non-transitory computer-readable media of claim 16, wherein generating the candidate inventory bin information comprises generating the candidate inventory bin information based at least in part on the relevancy scores for a subset of the plurality of inventory bins.

18. The one or more non-transitory computer-readable media of claim 15, wherein determining the inventory holder information comprises receiving a set of precomputed bin rankings that rank the plurality of inventory bins of the moveable inventory holder.

* * * * *